J. A. MODER.
CONTROLLING MEANS FOR HEADLIGHTS.
APPLICATION FILED MAY 16, 1910.
983,456.
Patented Feb. 7, 1911.
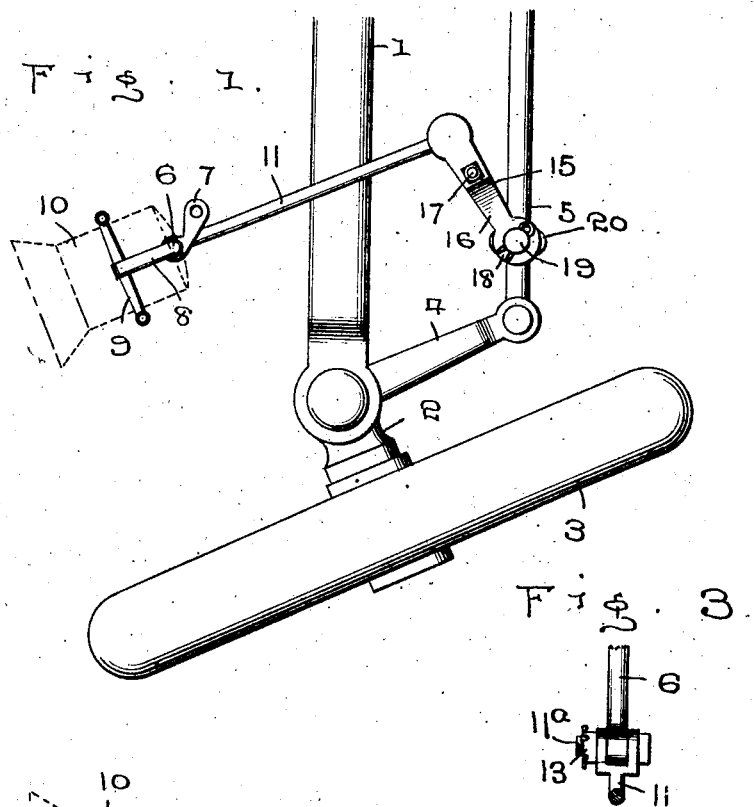
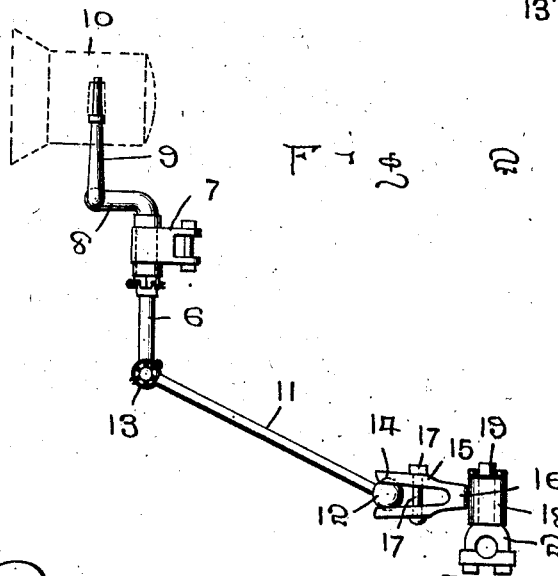
WITNESSES:
Thos W Riley
M. Newcomb
INVENTOR
J. A. Moder
BY
W. J. FitzGerald & Co.
Attorneys

UNITED STATES PATENT OFFICE.

JOHN ANDREW MODER, OF LAURIUM, MICHIGAN, ASSIGNOR OF ONE-HALF TO JOHN FRANK DUPONT, OF LAURIUM, MICHIGAN.

CONTROLLING MEANS FOR HEADLIGHTS.

983,456.

Specification of Letters Patent. Patented Feb. 7, 1911.

Application filed May 16, 1910. Serial No. 561,684.

*To all whom it may concern:*

Be it known that I, JOHN ANDREW MODER, a citizen of the United States, residing at Laurium, in the county of Houghton and State of Michigan, have invented certain new and useful Improvements in Controlling Means for Headlights; and I do hereby declare the following to be a full, clear, and exact description of the invention, such as will enable others skilled in the art to which it appertains to make and use the same.

My invention relates to new and useful improvements in controlling means for head lights and more particularly to that class adapted to be used in connection with motor propelled vehicles and my object is to provide means for adjustably mounting the lights upon the vehicle.

A further object is to provide means for attaching the lights to the steering mechanism of the vehicle.

A further object is to provide means for compensating for wear on the parts of the controlling means, and, a further object is to provide means for compensating the up and down movement of the vehicle body.

Other objects and advantages will be hereinafter referred to and more particularly pointed out in the specification and claims.

In the accompanying drawings which are made a part of this application, Figure 1 is a top plan view of a portion of the front axle of a vehicle showing my improved light controlling mechanism attached thereto. Fig. 2 is a side elevation of the light controlling mechanism removed from the vehicle, and, Fig. 3 is a detail elevation of parts of the light controlling mechanism.

Referring to the drawings in which similar reference numerals designate corresponding parts throughout the several views, 1 indicates the forward axle of the vehicle, to the ends of which are attached spindles 2, said spindles having the usual or any preferred form of wheels 3 mounted thereon. The spindles 2 are pivotally attached to the axle 1, so that the wheels can be readily turned to guide the vehicle, each spindle having a crank 4 attached to the pivoted end, to which is pivotally secured a rod 5, said rod being attached to the usual or any preferred form of steering mechanism (not shown).

The prime object of my invention is to shift the headlights on the vehicle so that when the vehicle is making a turn, the light will be thrown in the direction of the travel of the front wheels of the vehicle and to this end, I provide a shaft 6, which is rotatably mounted in a clip 7, which clip is adapted to be secured to the bed of the vehicle. That portion of the shaft 6 above the clip is preferably extended in a horizontal position and forwardly of the clip, the outer end of said section 8 having a fork 9 thereon, to which is secured the lamp 10. The upper end of the bar 11 is bifurcated to receive the lower end of the shaft 6, said bar being pivotally attached to the shaft 6 by introducing a bolt 11$^a$ through the bifurcated end of the bar 11 and the interposed portion of the shaft 6, any suitable form of lock nut 13 being used to hold the bolt in engagement therewith. The opposite end of the bar 11 is provided with a ball 12 which enters seats 14 in the arms 11 of a yoke 16, said yoke forming a socket for the ball and the arms are retained in engagement with the ball by extending a bolt 17 transversely through said arms and as the ball and seats become worn, the arms may be adjusted toward each other to compensate for such wear. The yoke 16 terminates in a socket 18, which socket is mounted upon a stem 19 carried by a clip 20, said clip being employed for securing the stem to the rod 5. By pivotally attaching the bar 11 and pivotally mounting the yoke 16 upon the rod 5 and extending said yoke substantially parallel with the rod, any downward movement of the vehicle body, as when traveling over rough roads, will not affect the action of the bar 11, as said bar can move downwardly as well as rearwardly when the body of the vehicle descends. By attaching the bar 11 to the steering rod 5 in the manner shown, it will be readily seen that when the rod is moved lengthwise to properly guide the wheels, the shaft 6 will be rotated and the rays from the lamp cast in the direction of travel of the vehicle. By this construction, it will be readily seen that the light will always be maintained in the line of travel of the front wheels of the vehicle, thus affording the driver a view of the road immediately in front of the vehicle at all times, when the vehicle is making a turn or when traveling straight forwardly. It will further be seen that the device can be very cheaply constructed and can be attached to any vehicle employing this form of steering means.

What I claim is:—

1. In a device of the character described, the combination with a steering rod of a motor vehicle; of a shaft having one end thereof forked, a lamp adapted to be seated in forked portion of said shaft, means to pivotally secure said shaft to the vehicle, a rod pivoted at one end to the lower end of said shaft and having the opposed end thereof provided with a ball, a yoke having seats therein engaging said ball, means to adjust said yoke to said ball, said yoke terminating in a socket, a stem extending through said socket, and means to secure said stem to said steering rod.

2. In a device of the character described, the combination with a steering rod of a motor vehicle; of a shaft having one end thereof forked, a lamp adapted to be seated in the forked portion of said shaft, a clip engaging said shaft and secured to the vehicle, a rod having one end thereof bifurcated and pivotally engaging the lower end of said shaft, the opposite end of said shaft being provided with a ball, a yoke having seats therein engaging said ball, means to securely adjust said yoke to said ball, said yoke terminating in a socket, a stem extending through said socket and means to secure said stem to said steering rod, for the purpose described.

In testimony whereof I have signed my name to this specification in the presence of two subscribing witnesses.

JOHN ANDREW MODER.

Witnesses:
 MAUDE MODER,
 FRANCES G. MODER.